Nov. 25, 1958     A. T. JANCOSEK ET AL     2,861,941
UREA-DEWAXING LUBRICATING OIL
Filed March 28, 1955
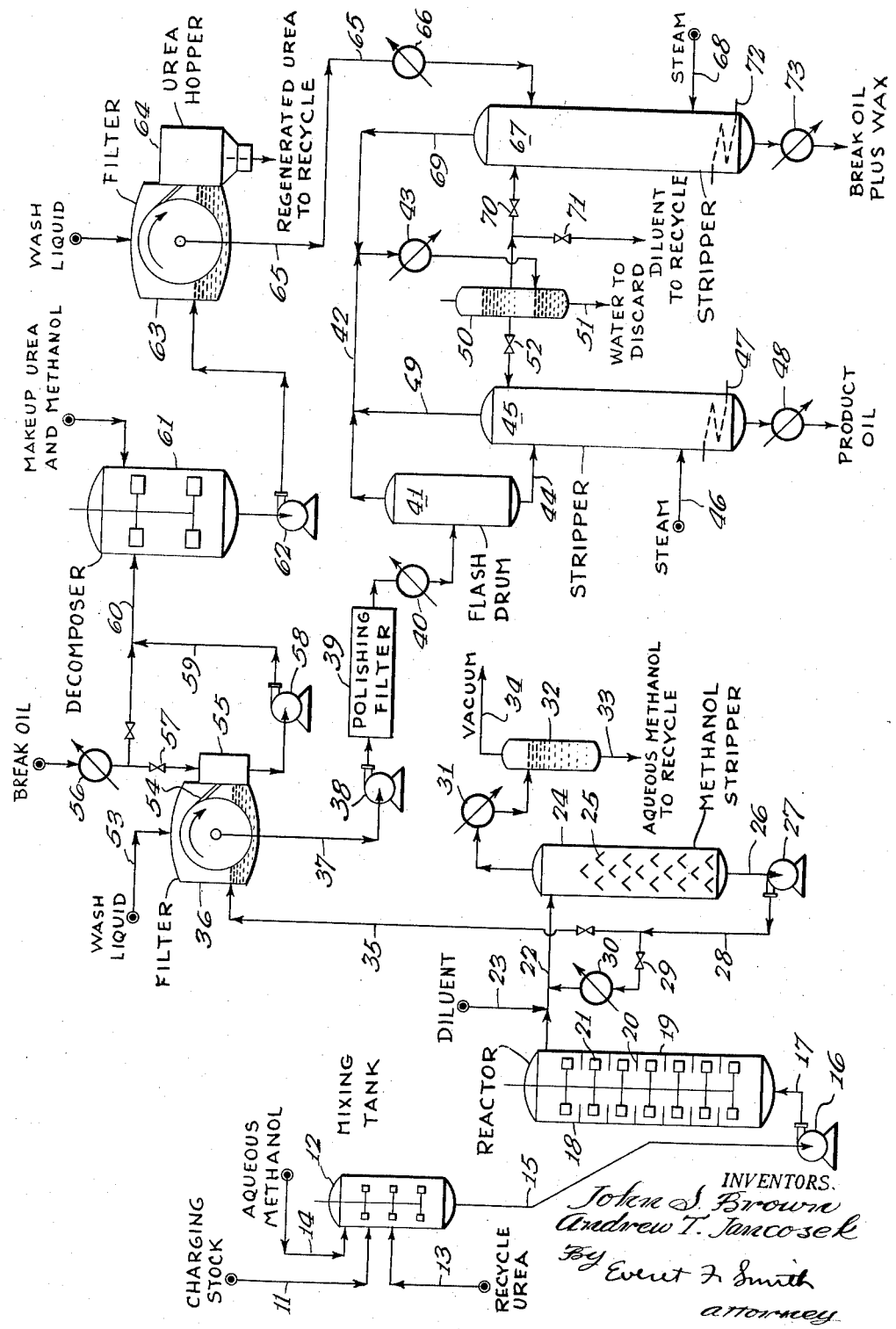
INVENTORS.
John S. Brown
Andrew T. Jancosek
By Everet F. Smith
attorney

2,861,941
UREA-DEWAXING LUBRICATING OIL

Andrew T. Jancosek, Hammond, Ind., and John S. Brown, Flossmoor, Ill., assignors to Standard Oil Company, Chicago, Ill., a corporation of Indiana Application March 28, 1955, Serial No. 497,236

3 Claims. (Cl. 208—25)

This invention relates to the preparation of urea adducts. More particularly, it relates to the treatment of adductible charging stocks with urea and to the separation of urea adducts therefrom.

It is now well known that urea reacts and forms solid adducts with a wide range of organic compounds. Such compounds must be essentially of straight-chain structure, and must contain at least six carbon atoms in the molecule; in other respects their composition and structure do not appear to be critical.

In treating various charging stocks with urea to form adducts, it has been conventional practice to dilute the stock with a liquid that is inert toward urea, especially where the stock is viscous or contains a high proportion of adductible substances. We have now discovered that the function of the diluent in preparing urea adducts is best effected by addition of the diluent to the reaction mixture after adduct formation is substantially complete and before separation of the adducts from the treated stock. Surprisingly, we have found that the formation of urea adducts takes place considerably more rapidly in the absence or substantial absence of a diluent. Thereafter, in separating the adducts from the resulting slurry, e. g., by filtration, a diluent is highly useful in reducing the viscosity of the slurry, increasing the filtration rate, and avoiding plugging of the filter medium.

It is accordingly an object of our invention to provide an improved method of preparing urea adducts. Another object is to improve the use of solid urea in urea-adduct formation. Another object is to improve the separation of urea adducts from reaction products comprised thereof. A further object is to improve the effectiveness of adduct formation between urea and waxes. A further object is to provide an improved method of urea-dewaxing applicable to the treatment of wax-containing stocks in the viscosity range of low cold-test oils. These and other objects of our invention will be apparent from the following description and the appended claims.

In a simple embodiment of our invention, a charging stock containing an adductible component is commingled with urea and an activating quantity of aqueous methanol, and the mixture is agitated at ordinary temperature, whereupon an insoluble urea adduct is formed. The slurry is then diluted with an inert liquid (i. e., a liquid which does not form an adduct with urea under the conditions employed), and is filtered by conventional means, suitably through an ordinary canvas filter, air pressure being used as needed to speed the filtration. The diluent liquid serves to reduce the viscosity of the reaction mixture, to minimize retention of charging stock on the adduct, to increase the filtration rate, and to avoid plugging of the filter medium. The filter cake can be washed if desired with a further quantity of the diluent liquid. The filtrate and washings are combined and stripped of diluent to give the desired product oil, substantially free from straight-chain components. Any dissolved methanol is simultaneously removed, and can be recovered from the stripper distillate. The urea adducts are slurried with a break-oil, such as an additional quantity of the diluent liquid, and are heated to a temperature above about 150° F. and below about 250° F., preferably between about 150 and 180° F., for a period of 10 minutes or more, preferably between about 0.5 and 1 hour. This treatment decomposes the adducts and liberates the urea, straight-chain materials, methanol, and water. The methanol is driven off as a vapor, which is condensed and recovered for recycle. The straight-chain materials dissolve in the break-oil, and the urea forms a slurry therein. The urea is separated by filtration, centrifugation, or the like, and is thereby recovered in a form suitable for use in the treatment of additional charging stock. The straight-chain materials are recoverable from the break-oil solution by stripping, fractional distillation, or the like.

Many hydrocarbon liquids are suitable as diluents in our process, so long as they do not form adducts with urea, although it will be apparent that the results obtained therefrom are not necessarily equivalent. We have successfully employed naphthas and other hydrocarbons, including pentane, isopentane, isooctane, benzene, toluene, light alkylate, heavy alkylate, and the like. The quantity of diluent to be used in any case will depend upon the viscosity of the reaction slurry, the mixing efficiency of the equipment, and the desired filtration rate. We have found that diluents can conveniently and advantageously be employed in many cases in proportions as low as 25 volume-percent and as high as 200 percent or more based on the charging-stock oil, depending largely upon the viscosity thereof, and preferably between about 50 and 100 percent. It is of course desirable to use diluents in as low a concentration as possible in order to minimize the difficulty and expense of recovery thereof.

With some charging stocks, urea appears to react in pure form. With others, the use of a mutual solvent for the charging stock and urea appears to be necessary or at least desirable. In such cases, the urea can be used as a solution in the solvent, or as a slurry in a saturated urea-solvent solution, or as a solid substance activated by contact with the solvent. In an especially advantageous process, urea in the form of a finely divided solid is contacted with a mixture of the charging stock and a small proportion of a water-miscible, oxygen-containing organic liquid boiling below about 212° F., including aliphatic monohydric alcohols such as methanol, ethanol, n-propyl alcohol, isopropyl alcohol, allyl alcohol, tert-butyl alcohol, 2-methyl-3-butene-2-ol, 2-methyl-3-butyne-2-ol, and the like; acetone; and acetaldehyde. Other highly water-soluble organic solvents may also be used, such as methyl ethyl ketone, dioxane, and the like. The activator is used in a molar ratio to urea between about 0.05:1 and 1:1, preferably between about 0.1:1 and 0.6:1—i. e., in an activating proportion, restricted, however, to less than the level at which a substantial liquid solvent phase exists in conjunction with the urea.

Urea should be used in our process in a proportion of at least about 0.75 mole per carbon atom in the urea-reactive compounds contained in the charging stock. For substantially complete adduct formation, the molar ratio of urea to urea-reactive organic material is ideally at least about $(n-2):1$, where $n$ is the number of carbon atoms per molecule in the urea-reactive compound.

The formation of urea adducts proceeds at any temperature below about 130° F. Ordinary temperatures in the range of about 75 to 80° F. are preferred. Temperatures above 100° F. are less satisfactory, because the activator tends to be driven off and the adducts are less stable; and temperatures below about 50° F. may be less satisfactory because of contacting difficulties arising from increased viscosity of the reaction mixture.

Our invention is especially advantageous in connection with the method described in our application Serial No. 474,549, filed December 10, 1954, employing urea dewaxing in the presence of a critical proportion of methanol and water to prepare low cold-test oils (i. e., hydrocarbon oils ranging in viscosity from about 40 to 300 SSU at 100° F., corresponding to SAE 10, SAE 5, and lighter grades, and ranging in pour point from 0° F. downward, e. g., from −10 to −70° F.). In the said process, a wax-containing stock of appropriate viscosity, preferably after a preliminary solvent-dewaxing step in accordance with the prior art, is subjected to contact with urea under adduct-forming conditions in the presence of about 0.05 to 0.5 mole of methanol per mole of urea and about 2 to 10 volume-percent of water based on the methanol. The urea and wax form an insoluble adduct, which is readily filtered from the oil by proceeding in accordance with our present invention, and a treated oil is obtained having a pour point within the desired range. The urea is conveniently recovered by known methods, and can be cyclically reused.

In the treatment of wax-containing stocks, about 4 pounds of urea are ordinarily sufficient to effect substantially complete removal of 1 pound of wax. For example, a propane-dewaxed Mid-Continent SAE 10 oil, which contains approximately 0.4 pound of adductible material per gallon, requires at least about 1.6 pounds of urea per gallon of oil for best results. A smaller urea:wax ratio gives incomplete wax removal and less than the maximum pour point lowering. We prefer to contact urea and charging stock in the proportion of around 4 to 8 pounds of free urea per pound of adductible wax contained in the stock.

In an advantageous embodiment of our invention, we use the same diluent liquid both in filtering the product slurry and in regenerating the urea. For this purpose, it is desirable to choose a liquid which is inert to urea at all temperatures, which boils in a different range from the charging stock, and which does not boil at the temperatures and under the conditions employed in adduct decomposition. A satisfactory diluent for many charging stocks is a light aviation alkylate, obtained by copolymerization of a mixed butylene stream. This material is inert to urea at all temperatures (as contrasted with pentane, which forms an adduct at 10° F. and lower), and boils in the range of about 130 to 340° F. A suitable high-boiling diluent is heavy alkylate, obtained for example as a bottoms fraction from the production of isooctane by alkylation. This material is also inert to urea at all temperatures, and boils in the range of about 350 to 800° F.

The attached drawing illustrates an embodiment of our invention in which a propane-dewaxed Mid-Continent SAE 5 distillate is continuously urea-treated in the presence of aqueous methanol, the reaction slurry is diluted with light aviation alkylate and continuously filtered to separate the urea-wax adducts from the dewaxed oil, the dewaxed oil is stripped of diluent and other low boilers to produce a low cold-test oil of the desired flash point, the urea adducts are decomposed by heating with additional diluent liquid, which dissolves the liberated wax, and the regenerated urea is employed to dewax a further quantity of the charging stock.

In the drawing, the charging stock, supplied through line 11, is commingled in mixing tank 12 with recycle urea, supplied by suitable charging means 13, and aqueous methanol in the desired amount, supplied through line 14. The resulting slurry flows through line 15, pump 16, and line 17 into the bottom of reactor 18, a vertically elongated vessel separated into vertically disposed compartments (e. g. 19) by means of horizontal baffles (e. g. 20). Each of the compartments is supplied with agitating means (e. g. 21). Urea adduct formation reaches substantial completion in 20 to 30 minutes, at the end of which time the reaction product emerges from the top of the reactor through line 22. An equal volume of light aviation alkylate is added through line 23 to the stream in line 22, and the mixture is led into the top of methanol stripper 24, suitably operated at an absolute pressure around 75 to 100 mm. Hg. The diluted reaction product flows downward over packing material 25, and emerges from the bottom of the stripper through line 26 into pump 27, from which it is recycled in part through line 28, valved line 29, heater 30, and line 22, the temperature being maintained at a stripping level between about 85 and 115° F. in this way. Methanol and water are taken off overhead as a vapor stream and are condensed in cooler 31. The condensate flows to receiver 32, and is taken off through line 33 for recycle. The receiver is connected through line 34 to a suitable vacuum source.

The stripped reaction slurry flows through valved line 35 into continuous drum filter 36. The filtrate therefrom flows through line 37, pump 38, polishing filter 39, and heater 40 into flash drum 41, operated at around 230° F. and approximately atmospheric pressure. A substantial proportion of the diluent liquid volatilizes in the flash drum, and is taken off through line 42 to condenser 43. The liquid stream from the flash drum flows through line 44 into an upper portion of stripper column 45, and is stripped therein with steam, introduced through line 46 into a lower portion of the column. The product oil is dried by heating means 47 at the bottom of the stripper column, and emerges through cooler 48 to storage. The overhead vapor stream, consisting largely of diluent liquid and water, flows through line 49 and line 42 into cooler 43, and the condensate is led into decanter 50. The aqueous (lower) phase in decanter 50 is withdrawn through line 51 and discarded. The organic (upper) phase is refluxed in part through valved line 52 to the top of stripper 45.

The filter cake in continuous filter 36 is washed with a suitable liquid (e. g., light aviation alkylate) supplied through line 53, and is removed by doctor blade 54 to receiver 55, where it is slurried with suitable break oil, such as an additional quantity of light aviation alkylate, supplied at elevated temperature through heater 56 and valved line 57. The resulting slurry is transferred by pump 58 through line 59 and line 60 to an agitated decomposer vessel 61, additional hot break oil being added as desired through valved line 62. Makeup urea is also added to vessel 61 in order to give it a preliminary activating treatment under adduct-decomposing conditions before it is used to contact fresh charging stock. A supplemental quantity of aqueous methanol may also be added if desired to assist in preconditioning the urea. Within the decomposer 61, the temperature is maintained at a level between about 155 and 170° F. Under these conditions, the urea adducts are broken apart, and the liberated waxes are dissolved by the break oil, while the urea is regenerated in solid, finely divided form, retaining an activating quantity of methanol and water. The resulting slurry is transferred by pump 62 through suitable lines into continuous filter 63, where the regenerated urea is washed with (for example) light aviation alkylate, and is withdrawn to urea hopper 64 for recycle.

The filtrate from filter 63, consisting largely of break oil, wash liquid, wax, and traces of methanol, emerges through line 65 and is led through heater 66 into an upper section of stripper column 67. Within the column, methanol and any other low boilers, together with any desired proportion of the light aviation alkylate, are stripped out with steam, introduced through line 68 into a lower section of the column, and emerge overhead through line 69 and condenser 43 to decanter 50. A portion of the organic phase from decanter 50 is refluxed to the top of stripper column 67 through valved line 70, and another portion is withdrawn through valved line 71 for recycle as diluent liquid. The bottoms from stripper 67 are dried by heating means 72, and emerge through cooler 73. This material consists largely of break oil plus wax.

It can be further processed, if desired, to recover the wax- or it can be sent to catalytic cracking.

Our invention will be more fully understood from the following specific examples:

Example 1

A propane-dewaxed SAE 10 lube-oil charging stock having a pour point of 0° F. was dewaxed without the use of a diluent according to the following procedure: A 20-pound portion of the charging stock was commingled at room temperature with 4 pounds of urea and 300 milliliters of aqueous 97 percent methanol, and the mixture was agitated for 2 hours at a maximum temperature of 85° F. Samples of the reaction mixture were taken at 10-minute intervals, and pour-point tests thereon indicated that urea-adduct formation had reached substantial completion at the end of 30 minutes. Filtration of the reaction product was carried out with 8 pounds of air pressure, and proceeded at the rate of 1.0 gallon per square foot of filter area per hour, a total elapsed time of 200 minutes being required. The filtrate weighed 17.1 pounds and had a pour point in the range of −20 to −30° F.

For comparison, another 20-pound portion of the charging stock was diluted with an equal volume of light aviation alkylate, and the above test was repeated. The temperature reached a maximum of 80° F. during adduct formation, and the reaction required 50 minutes to reach completion. Agitation was continued for a total of 160 minutes. Filtration of the reaction product proceeded at the rate of 21.4 gallons per square foot per hour (equivalent to 10.5 gallons of charging stock per square foot per hour), and required 20 minutes for completion. The filtrate was stripped of diluent, and the treated oil, weighing 18.8 pounds, was found to have a pour point in the range of 0 to −15° F.

In accordance with our invention, another 20-pound portion of the charging stock was urea-treated under the described conditions in the absence of a diluent, an equal volume of diluent was then added to the reaction product, and the diluted product was filtered. Adduct formation proceeded rapidly in the absence of a diluent, as described above. Filtration of the diluted mixture proceeded at the rate of 17.1 gallons per square foot per hour (equivalent to 8.5 gallons of charging stock per square foot per hour) and required a total of 25 minutes for completion. The filtrate was stripped of diluent, and the treated oil, weighing 18.6 pounds, was found to have a pour point in the range of −20 to −30° F. Thus, our new technique permits both rapid adduct formation and rapid product separation.

Example 2

Urea dewaxing of 802 Pale Oil (a refined distillate oil having a viscosity of 80 S. S. U. at 100° F. and a pour point of 35° F.) was carried out according to the following procedure: The 802 Pale Oil (1,319 grams) was slurried with urea (1,000 grams), methanol (140 milliliters), water (5 milliliters), and a handful of glass beads. Adduct formation took place rapidly at room temperature, and the mixture became too thick to filter. Two liters of pentane were then added, and the reaction mixture became fluid and readily filterable. The filterate, after being stripped free of pentane, weighed 1,170 grams, and had a viscosity of 92.8 S. S. U. at 100° F. and a pour point of −35° F.

Example 3

One kilogram of TK–153 furnace oil naphtha was slurried with 500 grams of fresh urea. No adduct formation took place. To the slurry were then added 35 milliliters of aqueous 97 percent methanol. Adduct formation began immediately, and the mixture became thick, cheese-like and unfilterable. After dilution with 2 liters of pentane, the reaction mixture filtered readily. The filtrate, on being stripped free from pentane, yielded an oil weighing 844.2 grams and having a pour point of −80° F.

Example 4

A solvent-extracted, propane-dewaxed SAE 5 lube oil stock weighing 500 grams was slurried with 200 grams of urea and 40 milliliters of aqueous 97 percent methanol, then chilled to 0° F. to encourage substantially complete urea-wax adduct formation. Filtration of the resulting viscous mixture was readily carried out at 0° F. after dilution with pentane.

Our invention is broadly useful in the formation and separation of urea adducts. It is now well known that urea forms solid adducts with the class of straight-chain aliphatic organic compounds, or organic compounds which are predominantly straight-chain in structure. In general, the straight-chain portion must contain at least about six carbon atoms in the molecule. Hydrocarbons, saturated or unsaturated, form adducts, and their adduct-forming properties are not destroyed by the presence of a functional substituent, terminally located. Adducts are thus formed by straight-chain or substantially straight-chain alcohols, aldehydes, ketones, carboxylic acids, esters, mercaptans, sulfides, disulfides, polysulfides, ethers, primary amines, secondary amines, halogenated hydrocarbons, and the like.

While we have described our invention with reference to certain specific embodiments thereof, it is to be understood that such embodiments are illustrative only and not by way of limitation. Numerous modifications and equivalents of the invention will be apparent to those skilled in the art from our description and from the appended claims.

In accordance with the foregoing description, we claim as our invention:

1. A method for further dewaxing a solvent-dewaxed lubricating oil having a viscosity below about 300 S. S. U. at 100° F., which comprises slurrying said oil in substantially undiluted form with finely divided urea under urea-adduct-forming conditions in the presence of between about 0.05 and 0.5 mole of methanol per mole of urea and between about 2 and 10 volume-percent of water based on said methanol for a sufficient period of time to form urea adducts with the straight-chain waxes contained in said oil, adding to the total reaction slurry resulting therefrom at least about 25 percent by volume of an inert diluent liquid, based on said solvent-dewaxed lubricating oil stock, separating urea adducts from the diluted reaction slurry, and separating said diluent liquid from the resulting liquid phase, whereby a treated oil having a pour point below about 0° F. is obtained.

2. A cyclic process for further dewaxing a solvent-dewaxed lubricating oil stock of not greater than SAE 10 viscosity and pour point above 0° F. and obtaining a low cold-test oil therefrom, which comprises slurrying said oil with finely divided urea in a proportion of at least about 4 pounds of urea per pound of straight-chain waxes contained in said oil in the absence of a diluent and in the presence of between about 0.5 and 4 gallons of aqueous methanol per 100 pounds of urea, said methanol containing between about 2 and 10 percent by volume of water, agitating the resulting mixture under conditions and for a sufficient time to form adducts with the straight-chain waxes contained in said oil, adding to the total reaction slurry obtained thereby between about 25 and 200 volume-percent of an inert diluent liquid, based on said solvent-dewaxed lubricating oil stock, filtering urea adducts and any unreacted urea from the diluted slurry, stripping diluent liquid from the treated liquid resulting therefrom, whereby a low cold-test oil having a pour point substantially below 0° F. is obtained, decomposing said urea adducts and recovering solid, finely divided urea therefrom, and reusing said urea to contact additional solvent-dewaxed lubricating oil stock.

3. A continuous process for urea-dewaxing a propane-dewaxed lubricating oil stock having a viscosity between about 40 and 300 S. S. U. at 100° F. and a pour point above 0° F. and obtaining a low cold-test oil therefrom, which comprises slurrying said oil in undiluted form at ordinary temperatures with at least about 4 pounds of urea per pound of straight-chain waxes contained in said oil and between about 1 and 2 gallons of aqueous methanol per 100 pounds of urea, said aqueous methanol containing between about 3 and 6 percent by volume of water, diluting the total reaction slurry resulting therefrom with between about 50 and 100 volume-percent of a liquid alkylate fraction, based on said propane-dewaxed lubricating oil stock, filtering urea adducts and any unreacted urea from the diluted slurry, stripped alkylate from the treated liquid resulting therefrom, whereby a treated oil having a pour point substantially below 0° F. is obtained, decomposing said urea adducts by contacting said adducts with a quantity of said alkylate fraction at a temperature between about 150 and 180° F., whereby the waxes are liberated and dissolved in said alkylate and the urea is regenerated in finely divided, highly active form, and recovering and recycling said urea to contact additional propane-dewaxed lubricating oil stock.

References Cited in the file of this patent

UNITED STATES PATENTS

| | | |
|---|---|---|
| 2,577,202 | Lien et al. | Dec. 4, 1951 |
| 2,681,335 | Gorin | June 15, 1954 |
| 2,689,845 | Dinerstein | Sept. 21, 1954 |
| 2,700,664 | Weedman et al. | Jan. 25, 1955 |
| 2,731,455 | Salzman et al. | Jan. 17, 1956 |
| 2,731,456 | Weedman | Jan. 17, 1956 |